(12) United States Patent
Serio

(10) Patent No.: US 7,747,521 B2
(45) Date of Patent: Jun. 29, 2010

(54) SYSTEM AND METHOD FOR MONITORING EVENTS ASSOCIATED WITH A PERSON OR PROPERTY

(75) Inventor: Dianna Lee Serio, Irvine, CA (US)

(73) Assignee: First American Corelogic, Inc., Santa Ana, CA (US)

( * ) Notice: Subject to any disclaimer, the term of this patent is extended or adjusted under 35 U.S.C. 154(b) by 32 days.

(21) Appl. No.: 11/677,535

(22) Filed: Feb. 21, 2007

(65) Prior Publication Data

US 2007/0198493 A1    Aug. 23, 2007

Related U.S. Application Data

(60) Provisional application No. 60/775,841, filed on Feb. 22, 2006.

(51) Int. Cl.
*G06Q 40/00* (2006.01)
(52) U.S. Cl. .................................. 705/38; 705/35; 705/7
(58) Field of Classification Search .................... 705/38; 707/1; 235/379–380; 709/218
See application file for complete search history.

(56) References Cited

U.S. PATENT DOCUMENTS

| 5,206,949 | A | * | 4/1993 | Cochran et al. ................. 707/4 |
| 5,659,731 | A | * | 8/1997 | Gustafson ....................... 707/4 |
| 5,892,900 | A | * | 4/1999 | Ginter et al. ................... 726/26 |
| 6,064,990 | A | | 5/2000 | Goldsmith |
| 6,393,387 | B1 | * | 5/2002 | Adriaans et al. .............. 703/27 |
| 6,484,176 | B1 | * | 11/2002 | Sealand et al. ................ 707/10 |
| 6,636,803 | B1 | * | 10/2003 | Hartz et al. .................. 701/208 |
| 6,721,728 | B2 | * | 4/2004 | McGreevy ...................... 707/3 |
| 6,871,140 | B1 | * | 3/2005 | Florance et al. ............. 701/207 |
| 7,028,052 | B2 | | 4/2006 | Chapman et al. |
| 7,054,841 | B1 | * | 5/2006 | Tenorio ........................ 705/57 |
| 7,181,465 | B2 | * | 2/2007 | Maze et al. ............... 707/104.1 |
| 7,310,618 | B2 | * | 12/2007 | Libman ....................... 705/38 |
| 2002/0049624 | A1 | * | 4/2002 | Raveis, Jr. ..................... 705/8 |

(Continued)

FOREIGN PATENT DOCUMENTS

EP    1067492    10/2001

(Continued)

OTHER PUBLICATIONS

KnowX—web.archive.org/web/20060113035726/http://www.knowx.com (2005) (KnowX).*

(Continued)

*Primary Examiner*—James P Trammell
*Assistant Examiner*—Chika Ojiaku
(74) *Attorney, Agent, or Firm*—Oblon, Spivak, McClelland, Maier & Neustadt, L.L.P.

(57) ABSTRACT

A system and method for retrieving a transaction associated with a property including obtaining property information pertaining to a property from a third party source, storing the property information in a database, receiving a name to monitor or an address of a property to monitor, and transmitting a property information request including the name and/or address to the database. The system and method may also include searching the property information for a match with the name or address, identifying a transaction associated with the matched name or address and transmitting the transaction to a device.

21 Claims, 3 Drawing Sheets

U.S. PATENT DOCUMENTS

| | | |
|---|---|---|
| 2002/0087460 A1 | 7/2002 | Hornung |
| 2002/0107703 A1* | 8/2002 | Feinberg et al. ............... 705/2 |
| 2003/0050891 A1* | 3/2003 | Cohen ........................ 705/42 |
| 2003/0105707 A1 | 6/2003 | Audebert et al. |
| 2004/0024605 A1* | 2/2004 | Morris ........................ 705/1 |
| 2004/0128232 A1* | 7/2004 | Descloux .................... 705/38 |
| 2004/0138995 A1* | 7/2004 | Hershkowitz et al. ......... 705/38 |
| 2004/0230448 A1 | 11/2004 | Schaich |
| 2005/0065874 A1 | 3/2005 | Lefner et al. |
| 2005/0071376 A1* | 3/2005 | Modi ...................... 707/104.1 |
| 2005/0187863 A1 | 8/2005 | Whinery et al. |
| 2005/0209873 A1* | 9/2005 | Anastasi ....................... 705/1 |
| 2005/0210068 A1* | 9/2005 | Szymanski et al. ....... 707/104.1 |
| 2006/0080230 A1 | 4/2006 | Freiberg |
| 2006/0178971 A1 | 8/2006 | Owen et al. |
| 2006/0184374 A1* | 8/2006 | Long ............................ 705/1 |
| 2007/0282735 A1* | 12/2007 | Schuebert .................... 705/38 |
| 2008/0281647 A1* | 11/2008 | Morris ........................ 705/7 |
| 2008/0281648 A1* | 11/2008 | Morris ........................ 705/7 |
| 2008/0281649 A1* | 11/2008 | Morris ........................ 705/7 |

FOREIGN PATENT DOCUMENTS

| | | |
|---|---|---|
| WO | WO 00/25251 | 5/2000 |
| WO | WO 00/46769 | 8/2000 |
| WO | WO 2006/031626 | 3/2006 |

OTHER PUBLICATIONS

Jay Romano, Your Home; Holding a House Hostage, Aug. 22, 1999, The New York Times, (Hostage).*

* cited by examiner

SYSTEM AND METHOD FOR MONITORING EVENTS ASSOCIATED WITH A PERSON OR PROPERTY

CLAIM OF PRIORITY UNDER 35 U.S.C. §119

The present Application for Patent claims priority to Provisional Application No. 60/775,841, filed on Feb. 22, 2006, and assigned to the assignee hereof and hereby expressly incorporated by reference herein.

FIELD

The invention relates generally to a system and method for monitoring events associated with a person or property. More specifically, the invention relates to a system and method for detecting when a third party associates a transaction with a person's name or property.

BACKGROUND

Fraud has been a big concern of businesses, individuals, and law enforcement officials. Many innocent citizens and companies have unfortunately been the victim of bad acts performed by one or more unscrupulous individuals. One area where fraud initially goes undetected is when it relates to a person's name or property. This is because a person or property owner may not know that someone has placed (or failed to remove) a "cloud" on their name or property until several months or years after it has occurred. For example, a third party may record or file a transaction associated with that person's name or property without their knowledge. The person or property owner will not know about the transaction until that person checks his/her own credit or tries to sell the property. Some examples of transactions include the failure to record or properly record mortgage satisfactions and the filing or recording of unknown or fraudulent documents, such as mechanic's liens, judgments, or other miscellaneous liens, against a person's name or property. These transactions can create a "cloud" on the person's name or property.

Significant consequences can result when a "cloud" is placed on the person's name or property. For example, the person may be subject to costly and time consuming legal issues, the person's credit worthiness or FICO score may be lowered, the person's property may be seized or sold, the property owner may be subject to higher interest rates for financing, and the property owner may have difficulty in purchasing other properties or selling the subject property. In extreme conditions, because of protracted issues, a deal may "fall out," resulting in the seller having to find another buyer altogether. Therefore, there exists a need in the art for a system and method for monitoring events or transactions associated with a person or property.

SUMMARY OF THE INVENTION

The invention may be used to monitor events associated with a person or a property. More specifically, the invention may be used to detect when a third party associates a transaction with a person's name or property. The transaction may involve, for example, the filing or recording of a document, or the failure to file or record a document.

A system and method for monitoring transactions associated with a person or a property may include the steps of storing (and continuously, periodically or randomly updating) information pertaining to a person or a property in a database, receiving subscriber information including a name to monitor or a property address to monitor, continuously or periodically searching the database for the name or the property address, identifying a transaction associated with the name or the property address, and transmitting the transaction (via email address or other mediums) to the affected person(s).

A system and method for retrieving a transaction associated with a property may include the steps of obtaining property information pertaining to a property from a third party source, storing the property information in a database, receiving an address of a property to monitor, and transmitting a search request including the address to the database. The system and method may also include the steps of searching the database for a match with the address, retrieving a transaction associated with the matched property address and transmitting the transaction via various medium to the affected person(s).

DETAILED DESCRIPTION

Systems and methods that implement the embodiments of the various features of the invention will now be described with reference to the drawings. The drawings and the associated descriptions are provided to illustrate embodiments of the invention and not to limit the scope of the invention. Reference in the specification to "one embodiment" or "an embodiment" is intended to indicate that a particular feature, structure, or characteristic described in connection with the embodiment is included in at least an embodiment of the invention. The appearances of the phrase "in one embodiment" or "an embodiment" in various places in the specification are not necessarily all referring to the same embodiment. Throughout the drawings, reference numbers are re-used to indicate correspondence between referenced elements. In addition, the first digit of each reference number indicates the figure in which the element first appears.

Figure 1:
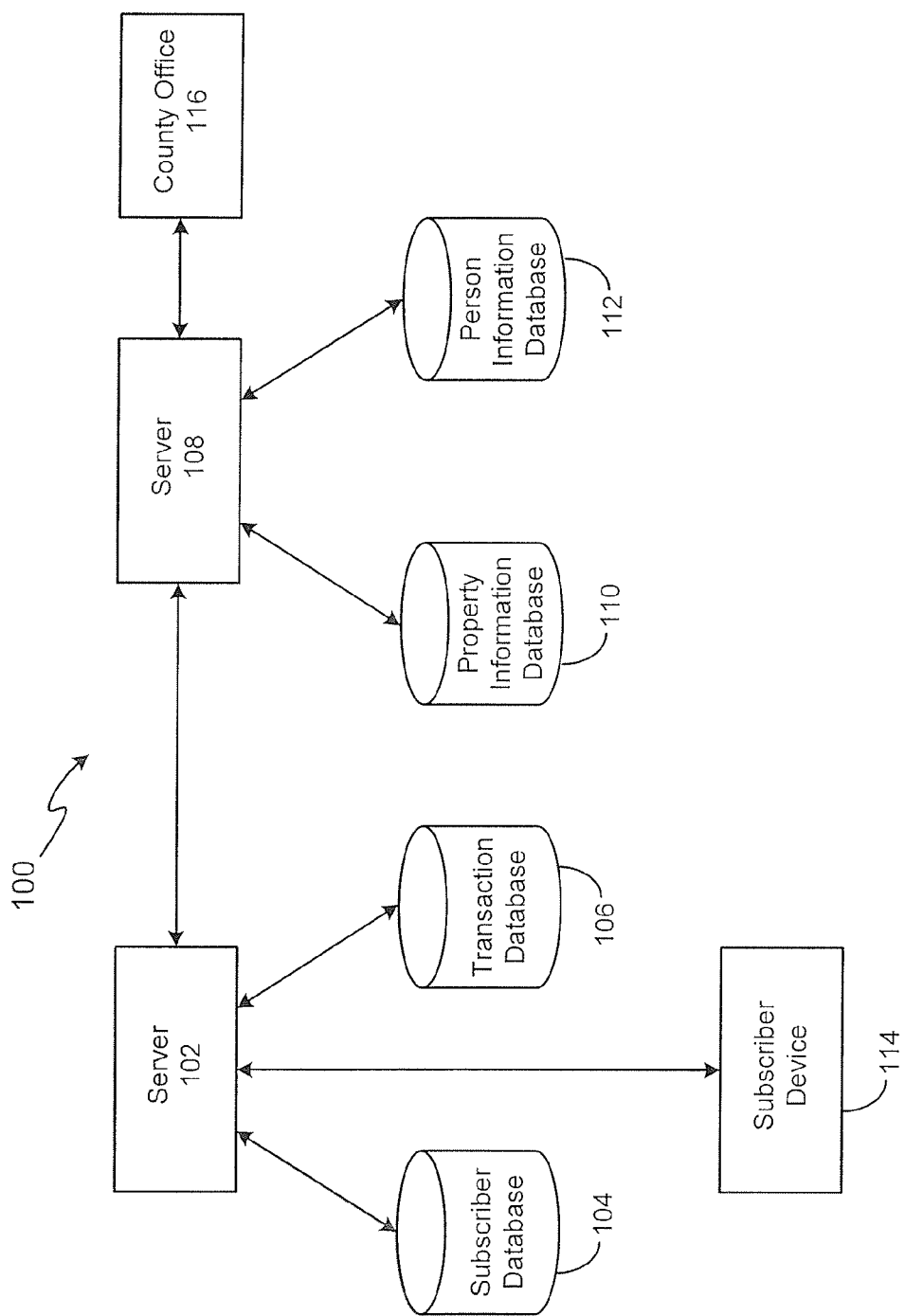
FIG. 1 is a simplified block diagram of a system for monitoring events or transactions associated with a person or property according to an embodiment of the invention.

FIG. 1 is a simplified block diagram of a system 100 for monitoring events or transactions associated with a person or property according to an embodiment of the invention. The system 100 is an exemplary system used to implement the methods of the invention. The system 100 can be implemented in hardware, software, or a combination of hardware and software. The system 100 can include more or less elements as shown in FIG. 1. The invention provides systems and methods for monitoring events or transactions associated with a person or property. Also, the invention provides systems and methods for detecting when a third party associates (or fails to associate) a transaction with a person's name or property.

The system 100 may include a server 102, a subscriber database 104, a transaction database 106, a server 108, a property information database 110, a person information database 112, and a subscriber device 114. The server 102 and the server 108 may be a single server or may be more than the two servers shown. The servers 102 and 108 may be one or more servers or computers or any other device capable of electronically transmitting, searching and/or receiving information. Also, the databases can be combined into one or more databases.

The server 102 may be used to input or receive subscriber information including a person's name or a property address, automatically, continuously, periodically and/or randomly transmit requests to the server 108 (or database 110 and/or database 112) for information pertaining to the person or the property, identify information (e.g., transactions) in the property information database 110 and/or the person information database 112 pertaining to the person or the property, and send a notification (e.g., an email or a fax) to the subscriber device 114. After the transaction has been identified, the notification may be automatically sent from the server 102 to the subscriber device 114 using push technology such as email, facsimile, phone or other means.

The subscriber database 104 stores a list of subscribers for the monitoring and notification service. The subscriber may be a person, business, property owner, deed holder, title holder, or any person or entity seeking to obtain information about a person, business or property. The list may include the subscriber's name, address, email address, fax number, home phone number, business phone number, cellular phone number, preferred way to contact the subscriber (e.g., via email) as well as other information pertaining to the subscriber.

The transaction database 106 stores a list of transactions (or conditions) and a corresponding degree of seriousness rating. The transaction database 106 may also store a list of potential actions the person or the property owner may wish to take to remedy the threat (i.e., add, remove or correct the transaction or condition).

In general, the transaction or condition may be something (or failure to do something) that affects a person's or subscriber's name or property. The transactions (or conditions) may be documents that include all forms of encumbrances, fraud, or other legitimate or illegitimate actions that may compromise a subscriber's credit worthiness (e.g., FICO score), reputation, property, ownership interest and financial position. The transaction (or condition) may involve, for example, filing or recording a document for a particular property, or failure to file or record a document against a particular property, or recording or failing to record a document which relates to a mortgage secured by a particular property or which relates to a particular name or FICO score. For example, when a new mortgage is recorded, it is often expected that a release of the previous mortgage would also be recorded. If a satisfaction and release of the previous mortgage is not recorded, this amounts to a condition which could lead to important consequences for the subscriber.

The server 108 may be used to receive subscriber information including a person's name or a property address, search the property information database 110 and/or the person information database 112 for the person's name or the property address, if the person's name or property has been found, request and/or retrieve one or more transactions related to the person's name or property, and transmit the transaction information to the server 102 or the subscriber device 114.

The property information database 110 and/or the person information database 112 may include a list of owner names and/or properties and a list of corresponding transactions that have been filed or recorded against the person and/or property. For example, if the property address is 500 Bristol Avenue, and an encumbrance or lien of any kind (e.g., financing document, pre-foreclosure document, deed, mortgage, assignment, release, judgment, or state or federal tax lien) was recorded on Jan. 1, 2006, then the transaction will be the lien recorded on Jan. 1, 2006. In another example, if the property at 700 Bristol Avenue was sold on Jan. 10, 2006, but the sale was not recorded, then the transaction will refer to the last transaction, which may state: "sale recorded on Dec. 10, 1990." This indicates that the sale on Jan. 10, 2006 has not been recorded.

The property information database 110 may contain all filed and/or recorded documents for all the subscriber's properties. The person information database 112 may contain all filed and/or recorded documents for all the subscribers. In one embodiment, the property information database 110 and the person information database 112 may be the same database, may be located in a central location and may retrieve subscriber information from one or more county offices 116, credit reporting offices, locations or resources. For example, various county offices 116 and credit reporting services may receive requests from the server 108 to update the personal information or property information for a particular subscriber. The various county offices 116 and credit reporting services may transmit the information to the server 108 via the Internet, facsimile, telephone, email, etc. In one embodiment, the server 108 automatically receives information (e.g., filed and recorded real estates transactions) pertaining to a subscriber on an hourly or a daily basis from one or more county recorder offices 116. The information may be electronically sent via the Internet from the various county recorder offices 116 to the server 108. The information may be stored on the property information database 110 and/or the person information database 112. In one embodiment, a database administrator receives the call or facsimile from the various county recorder offices 116 and inputs the information for storage in the property information database 110 and/or the person information database 112.

The subscriber device 114 may be a handheld device (e.g., a cellular phone, PDA, BlackBerry or Palm), a laptop computer, a desktop computer, a server or any other device capable of allowing a user to view information.

Figure 2A:
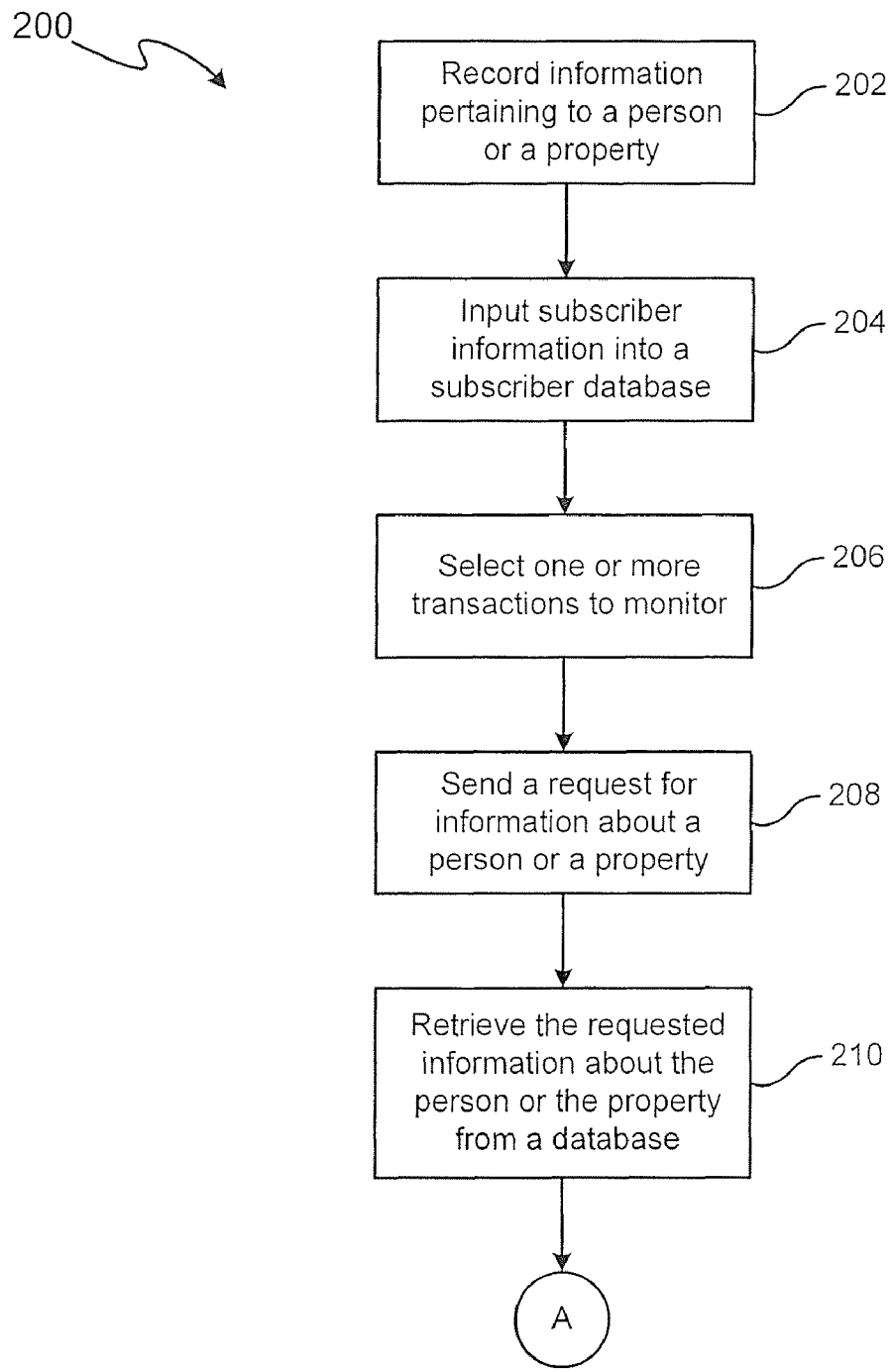
FIGS. 2A and 2B is a flow chart of a method for monitoring events, transactions or conditions associated with a person or property according to an embodiment of the invention.
Figure 2B:
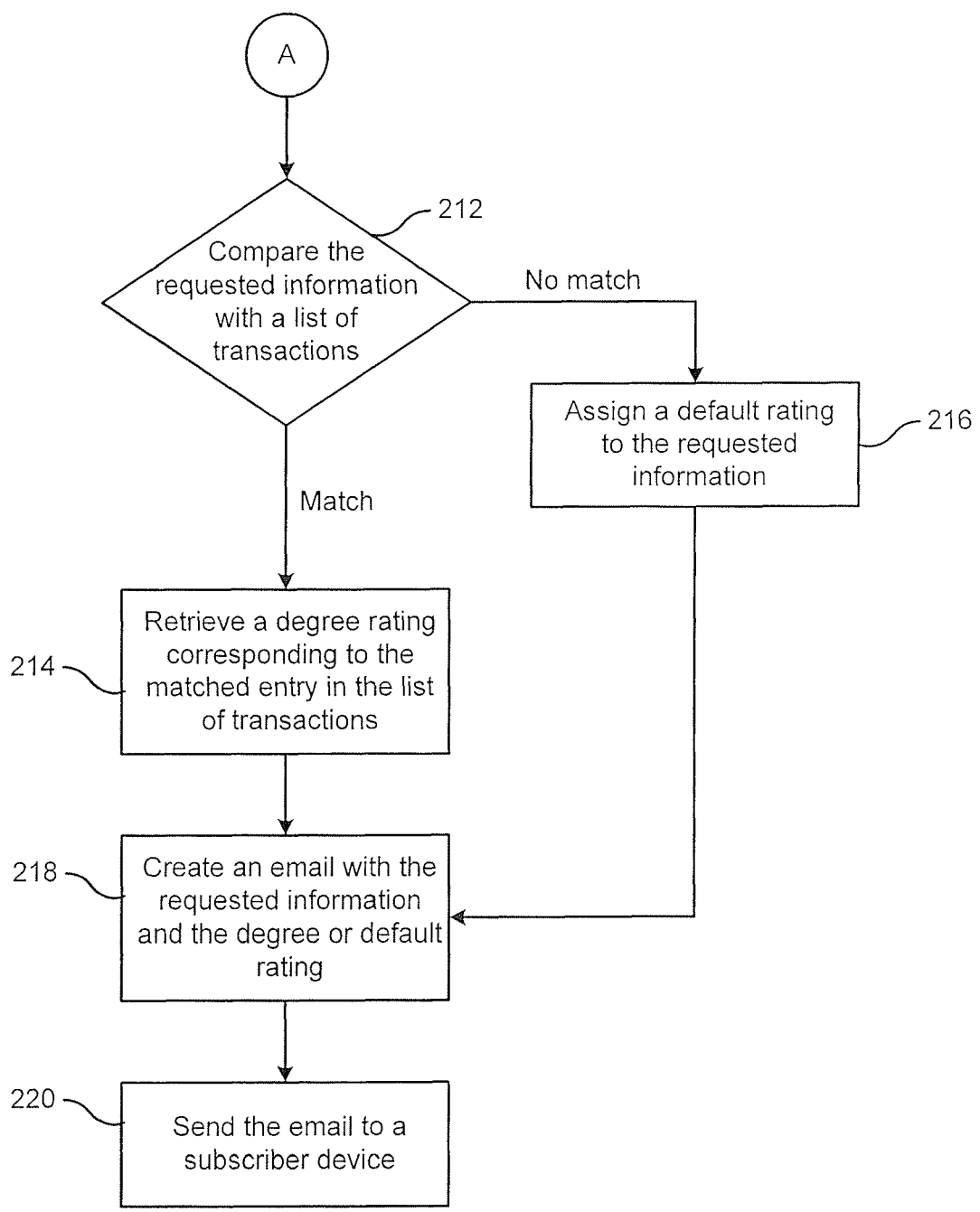

FIGS. 2A and 2B is a flow chart 200 of a method for monitoring events, transactions or conditions associated with a person or property according to an embodiment of the invention. At step 202, information pertaining to a person or a property is documented, lodged or recorded by a third party (e.g., a county recorder office, a credit reporting service, etc.) using the server 108 or at the county offices 116. The county clerk may use its own server or the server 108 to input or scan in the information. The information may be sent to the server 108 for storage in the property information database 110 and/or the person information database 112. For example, the county recorder's office may use its own computer to input the information and then send it to the server 108 for storage in the property information database 110 when new information for a particular property in its county is filed or recorded at its office. The information may be updated hourly, daily or weekly.

The server 102 may be used to input the subscriber's information into the subscriber database 104 (step 204). In one embodiment, the subscriber pays a monthly fee or a use-based service fee to receive notifications about events, transactions or conditions that have been filed or recorded against the subscriber's name or property. Using a graphical user interface, the subscriber may request or select one or more transactions to monitor (step 206). For example, the subscriber may select to monitor filed or recorded transactions associated with a person's name or property, transactions that should have been filed or recorded (i.e., missing transactions), property sales within a specified area (e.g., 10 mile radius), property (e.g., home) values within a specified area, whether property taxes have been paid for a particular property, and an aerial map of the property with parcel and street map overlays. The subscriber may also monitor all transactions associated with a person or property.

If the subscriber is aware of a specific transaction related to a person or property, the subscriber may input this information as a transaction. For example, if the subscriber refinances his/her property, the subscriber can input the transaction as "a refinance on Jan. 25, 2006." This transaction may be stored in the subscriber database 104 and may be sent to the server 108 and may be stored in the property information database 110. Based on the transaction, the server 108 searches the property information database 110 and/or the person information database 112 for a related transaction. The searches for the related transaction can be performed daily for 90 or 180 days after the transaction has occurred. If the related transaction is not found, the server 108 notifies the subscriber that a transaction is missing. For example, if the subscriber refinances a property (transaction), the server 108 knows that the refinancing documents (i.e., new mortgage) should be recorded (related transaction) within, for example, 90 days. The server 108 periodically checks the property information database 110 for the recordation. If the recordation does not occur within the specified time period, the server 108 notifies the subscriber that the refinancing has not been recorded. In addition, the server 108 knows that the recordation of the refinancing documents also requires the recordation of a satisfaction and release of the old mortgage. That is, when a new mortgage is recorded, it is often expected that a release of the previous mortgage would also be recorded. Hence, if any of these documents are not recorded, the subscriber is notified of all missing transactions.

For each subscriber, the server 102 automatically sends a search request for information to the server 108 (step 208). The request includes the name or property and the desired information (e.g., filed or recorded transactions). The requests can be made hourly, daily or weekly. The server 102 may request information for all its subscribers.

The server 108 retrieves the requested information from the property information database 110 or the person information database 112 (step 210). In one embodiment, the server 108 searches the property information database 110 for the property identified in the request and the person information database 112 for the person identified in the request.

The server 102 receives the requested information from the server 108. In one embodiment, the server 102 compares the requested information with the list of transactions (or conditions) in the transaction database 106 for a match (step 212). If a match is found, the server 102 may retrieve a degree of seriousness rating corresponding to the matched entry in the list of transactions (step 214). If a match is not found, the server 102 may assign a default rating (e.g., high) to the requested information (step 216). In one embodiment, the degree ratings can be high, medium and low. The server 102 creates an email with the requested information and the degree of seriousness rating (step 218) and sends the email to the subscriber device 114 (step 220). In one embodiment, the email may include one or more links to the requested information and the degree of seriousness rating.

In describing embodiments of the invention illustrated in the drawings, specific terminology is employed for the sake of clarity. However, the invention is not intended to be limited to the specific terminology so selected, and it is to be understood that each specific element includes all technical equivalents which operate in a similar manner. Furthermore, the inventor recognizes that newly-developed technologies not now known may also be substituted for the described parts and still not depart from the scope of the invention.

Portions of the invention may be conveniently implemented using one or more conventional general purpose or a specialized digital computer or microprocessors programmed according to the teachings of the present disclosure, as will be apparent to those skilled in the computer art. Appropriate software coding can readily be prepared by skilled programmers based upon the teachings of this disclosure, as will be apparent to those skilled in the software art. All or portions of the invention may also be implemented by the preparation of application-specific integrated circuits or by interconnecting an appropriate network of conventional component circuits, as will be readily apparent to those skilled in the art based upon the this disclosure.

The invention includes at least one computer program product which is in a storage medium (media) having instructions stored thereon/in which can be used to control, or cause, a computer to perform any of the processes of the invention. The storage medium can include, but is not limited to, any type of disk including floppy disks, mini disks (MDs), optical discs, DVD, CD-ROMs, micro-drive, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer-readable medium (media), the invention includes software for controlling both the hardware of the general purpose/specialized computer or microprocessor, and for enabling the computer or microprocessor to interact with the human user or other mechanism utilizing the results of the invention. Such software may include, but is not limited to, device drivers, operating systems, and user applications. Data used by the software may be retrieved from different sources (local or remote) and either permanently or temporarily stored (before, during or after processing) by utilizing any of the text files, delimited files, database(s), or other storage techniques. Ultimately, such computer-readable media further includes software for performing the invention, as described above.

Included in the programming (software) of the general/specialized computer(s) or microprocessor(s) are software modules for implementing the teachings of the invention, including, but not limited to, uploading property data requests to a database, using a mobile device to download those property data requests, inputting property data into the mobile device, uploading property data to another database, software used to review the property data for errors, and providing that property data to the subscriber. Obviously, numerous modifications and variations of the invention are possible in light of the above teachings. It is therefore to be understood that within the scope of the appended claims, the invention may be practiced otherwise than as specifically described herein.

What is claimed is:

1. A computer-based method of monitoring transactions associated with a person's real property comprising the steps of:

storing information in a database pertaining to a public record transaction affecting the real property;

receiving from a subscriber and storing in the database subscriber information, said subscriber information including a property address of the real property to monitor and an email address;

iteratively monitoring the database by a processor-implemented search process for an occurrence of the property address stored in the database to find a first match;

identifying via a processor an indication of the public record transaction stored in the database associated with the property address and the first match; and transmitting the indication of the public record transaction to the email address.

2. The method of claim 1 further comprising:
sending a request for information about a name of the real property owner to the database.

3. The method of claim 1 further comprising:
comparing the indication of the public record transaction to a list of transactions to find a second match, the list of transactions include a plurality of public record transaction types and a degree of seriousness rating corresponding to each of the plurality of public record transactions; and retrieving a degree of seriousness rating corresponding to the second match in the list of transactions, wherein the degree of seriousness rating being selected from a group having least three gradations of seriousness.

4. The method of claim 3 further comprising the step of transmitting the degree of seriousness rating corresponding to the second match to the email address.

5. The method of claim 3 further comprising assigning a default degree of seriousness rating to the public record transaction after the second match for the public record transaction is not found in the list of transactions.

6. The method of claim 1 wherein the public record transaction is a recording of a document against the real property.

7. The method of claim 1 wherein the public record transaction is a lien against the real property, and the lien having a property address associated with the real property.

8. The method of claim 1 further comprising:
comparing the indication of the public record transaction with a list of transactions to find a second match, the list of transactions including a plurality of public record transaction types and a remedy associated with each of the plurality of public record transaction types; and retrieving the remedy corresponding to the second match in the list of transactions, wherein the remedy is selected from a group of remedies including an adding of a subsequent transaction remedy associated with a first transaction type, a correction of the transaction remedy associated with a second transaction type, and a removal of the transaction remedy associated with a third transaction type, wherein the plurality of public record transaction types include
the first transaction type
the second transaction type, and
the third transaction type.

9. The method of claim 8 further comprising transmitting the remedy to the email address.

10. A computer-based method of retrieving a transaction associated with a property comprising the steps of:
obtaining property information pertaining to a property from a third party source;
storing the property information in a database;
receiving an address of the property to monitor;
transmitting a property information request including the address to the database;
iteratively searching with a processor the property information for a first match with the address;
retrieving a transaction associated with the first match;
comparing the transaction with a list of transactions for a second match, the list of transactions include a plurality of public record transaction types and a degree of seriousness rating corresponding to each of the plurality of public record transaction types;

retrieving a degree of seriousness rating corresponding to the second match in the list of transactions; and
transmitting the transaction to a device to notify a property owner of the transaction related to their property,
wherein the degree of seriousness rating being selected from a group having at least three gradations of seriousness.

11. The method of claim 10 further comprising the step of transmitting the degree of seriousness rating corresponding to the second match to an email address.

12. The method of claim 10 wherein the transaction is a recording of a document against a real property.

13. The method of claim 10 wherein the transaction is a lien against a real property.

14. The method of claim 10 further comprising the step of comparing the transaction to a list of transactions for a second match and retrieving a remedy corresponding to the second match in the list of transactions, wherein the list of transactions further includes remedies corresponding to each of the plurality of public record transactions types.

15. The method of claim 14 further comprising the step of transmitting the remedy to an email address.

16. The method of claim 10 further comprising the step of assigning a default degree of seriousness rating to the transaction after the second match cannot be found in the list of transactions.

17. A computer-based method of monitoring an absence of a public record transaction associated with a person's real property comprising the steps of:
storing information pertaining to the real property in a database;
receiving a request from a subscriber to monitor the public record transaction, the request including a property address associated with the public record transaction, the request including a datum transaction associated with the public record transaction;
iteratively monitoring the database with a processor for the public record transaction; and
transmitting a notification to a device if the public record transaction has not occurred within a predetermined time period relative to the datum transaction.

18. The method of claim 17 wherein the datum transaction is an execution of a financing document having a document identifier and the public record transaction is a recording of the financing document identified by a document name.

19. The method of claim 18 wherein the document identifier is a name of a mortgage document.

20. The method of claim 19 wherein the predetermined time period is 90 days.

21. A computer-based method of monitoring transactions associated with real property, comprising:
storing information in a database pertaining to a plurality of public record transactions;
receiving subscriber information from a subscriber and storing the subscriber information in the database, said subscriber information including a property address of real property to monitor, and an email address;
iteratively monitoring the database with a processor that executes a search process for identifying an occurrence of the property address stored in the database;
identifying with the processor an indication of at least one of the plurality of public record transactions associated with the property address; and
transmitting the indication of the at least one of the plurality of public record transactions to the email address.

* * * * *